(12) United States Patent
Kojo (10) Patent No.: US 11,987,270 B2
(45) Date of Patent: May 21, 2024

(54) VEHICLE DISPATCH MANAGEMENT DEVICE AND VEHICLE DISPATCH MANAGEMENT METHOD

(71) Applicants: Nissan Motor Co., Ltd., Kanagawa (JP); RENAULT S.A.S., Boulogne-Billancourt (FR)

(72) Inventor: Naoki Kojo, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 861 days.

(21) Appl. No.: 17/045,397

(22) PCT Filed: Apr. 13, 2018

(86) PCT No.: PCT/IB2018/000481
§ 371 (c)(1),
(2) Date: Oct. 5, 2020

(87) PCT Pub. No.: WO2019/197854
PCT Pub. Date: Oct. 17, 2019

(65) Prior Publication Data
US 2021/0163041 A1 Jun. 3, 2021

(51) Int. Cl.
*B60W 60/00* (2020.01)

(52) U.S. Cl.
CPC .. *B60W 60/0023* (2020.02); *B60W 60/00253* (2020.02); *B60W 2510/244* (2013.01); *B60W 2556/45* (2020.02)

(58) Field of Classification Search
CPC ....... B60W 60/0023; B60W 60/00253; B60W 2510/244; B60W 2556/45; G06Q 50/10
See application file for complete search history.

(56) References Cited

U.S. PATENT DOCUMENTS

2013/0173106 A1* 7/2013 Konishi ................. B60W 20/11
701/123
2019/0130763 A1* 5/2019 Kawasaki .......... H04B 7/15507

FOREIGN PATENT DOCUMENTS

JP 2000102102 A * 4/2000
JP 2014-032459 A 2/2014

OTHER PUBLICATIONS

International Search Report issued in PCT/IB2018/000481 mailed on Sep. 4, 2018 (5 pages).

* cited by examiner

Primary Examiner — Nga X Nguyen
(74) Attorney, Agent, or Firm — Osha Bergman Watanabe & Burton LLP (57) ABSTRACT

In a vehicle dispatch management system which manages a plurality of shared vehicles (2) and dispatches the shared vehicles in response to a dispatch request from a user, the vehicle dispatch management system includes: an individual cruising distance calculation device (22) configured to calculate a cruising distance of each of the shared vehicles; a total cruising distance calculation device (17) configured to calculate a total cruising distance of all of the shared vehicles; an energy supply determination device (18) configured to determine a necessity of traveling energy supply of the shared vehicle when the total cruising distance is equal to or less than a first predetermined value; and a supply instruction device (19) configured to instruct a supply instruction to the shared vehicle determined to be supplied on the basis of determining the necessity of traveling energy supply of the shared vehicle.

14 Claims, 5 Drawing Sheets

When charging is managed individually (comparative example)

| Time | Vehicle X | Vehicle Y | Vehicle Z | Opportunity loss |
|---|---|---|---|---|
| 9-10 | 100% | 100% | 100% | 0 |
| 10-11 | 80% | 80% | 100% | 0 |
| 11-12 | 60% | 80% | 80% | 0 |
| 12-13 | 60% | 60% | 60% | 0 |
| 13-14 | 40% | 40% | 40% | 0 |
| 14-15 | 20% | 20% | 40% | 0 |
| 15-16 | Charging | Charging | 20% | 1 |
| 16-17 | 100% | 100% | Charging | 1 |
| 17-18 | 80% | 100% | 100% | 0 |

High demand: 13-14, 16-17

Charge the battery individually at 20% or less.

When charging is managed as a whole (Example)

| Time | Vehicle X | Vehicle Y | Vehicle Z | Opportunity loss |
|---|---|---|---|---|
| 9-10 | 100% | 100% | 100% | 0 |
| 10-11 | 80% | 80% | 100% | 0 |
| 11-12 | 60% | 80% | 80% | 0 |
| 12-13 | 60% | 60% | 60% | 0 |
| 13-14 | 40% | 40% | 40% | 0 |
| 14-15 | Charging | 20% | 40% | 0 |
| 15-16 | 100% | Charging | 20% | 0 |
| 16-17 | 80% | 100% | Charging | 1 |
| 17-18 | 60% | 80% | 100% | 0 |

High demand: 13-14, 16-17

Charge the battery at 50% or less of the total average.

VEHICLE DISPATCH MANAGEMENT DEVICE AND VEHICLE DISPATCH MANAGEMENT METHOD

TECHNICAL FIELD

The present invention relates to a vehicle dispatch management system and a vehicle dispatch management method.

BACKGROUND ART

A vehicle dispatch management system is known, which is a vehicle dispatch management system for a plurality of users to jointly use electric vehicles and which includes conforming whether or not the remaining battery power exceeds the estimated power consumption when determining the electric vehicle to be dispatched or allocated to the user, determining the dispatch of the electric vehicle if this is satisfied, and rapidly charging the electric vehicle to be dispatched when there is no electric vehicle having the remaining battery power exceeding the estimated power consumption (Patent Document 1).

PRIOR ART DOCUMENT

Patent Document

[Patent Document 1] JP-2014-032459 A

SUMMARY OF INVENTION

Problems to be Solved by Invention

In the above-mentioned related art, when there is a margin in the time from the dispatch reservation to the dispatch, a problem does not occur if the battery is charged even if the remaining amount of the battery is insufficient. However, in a so-called on-demand type vehicle dispatch service in which a shared vehicle is dispatched in a short time in response to a real-time vehicle dispatch request from a user, there is a problem that a charging time is insufficient and a waiting time of the user occurs. This problem is not limited to an electric vehicle or a hybrid vehicle in which a motor is used as a driving source, but also a gasoline vehicle or a diesel vehicle in which an internal combustion engine is used as a driving source.

An object of the present invention is to provide a vehicle dispatch management system and a vehicle dispatch management method capable of dispatching a vehicle even if the lead time from a vehicle dispatch request to a vehicle dispatch is short.

Means for Solving Problems

The present invention solves the above problem by calculating the total cruising distance of a plurality of shared vehicles, determining a necessity of traveling energy supply of the shared vehicle when the total cruising distance is equal to or less than a predetermined value, and instructing the supply instruction to the shared vehicle determined to be supplied on the basis of determining the necessity of the traveling energy supply of the shared vehicle.

Effect of Invention

According to the present invention, it is determined whether or not the total cruising distance of a plurality of shared vehicles is equal to or less than a predetermined value, and when the total cruising distance is equal to or less than the predetermined value, a supply instruction is instructed to the shared vehicle determined to be supplied, so that it is possible to maintain the total cruising distance at or above a predetermined value. As a result, since the remaining capacity of the vehicle dispatch service can be maintained at a certain level or more, it is possible to dispatch the vehicle even if the lead time from the vehicle dispatch request to the vehicle dispatch is short.

MODE(S) FOR CARRYING OUT THE INVENTION

Figure 1:
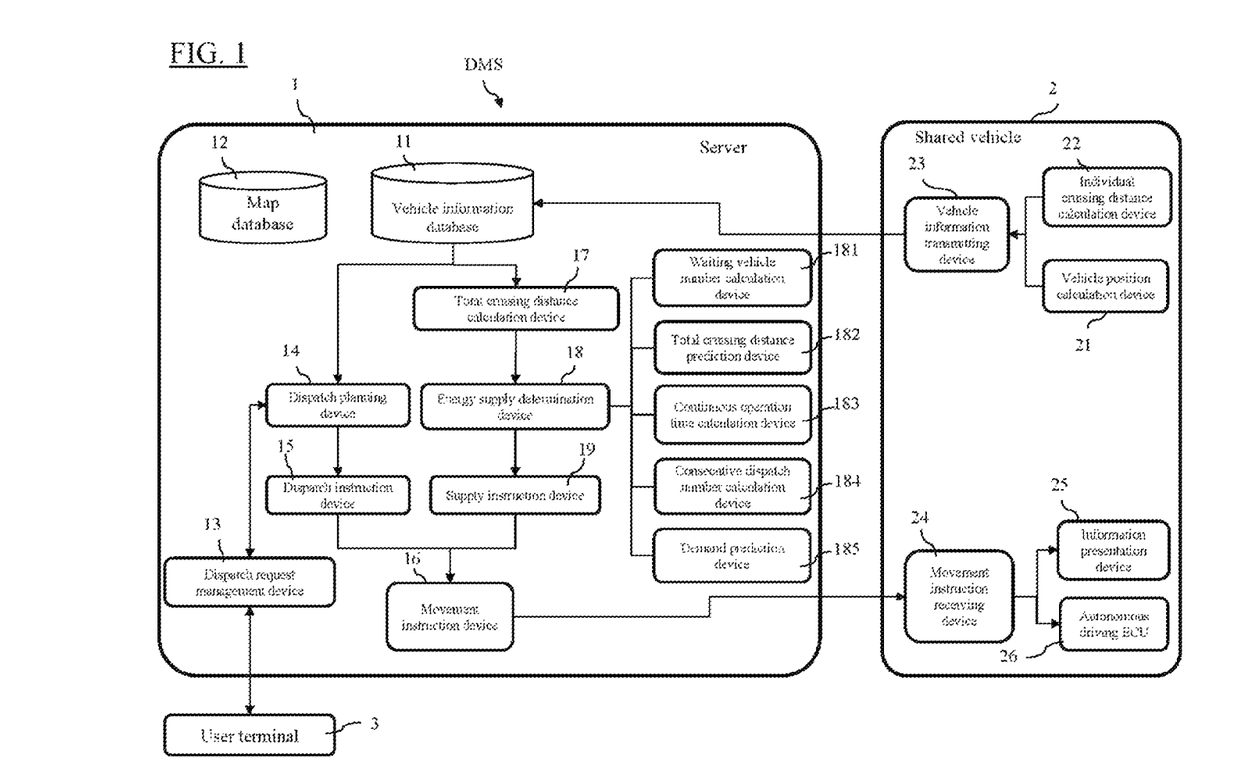
FIG. 1 is a block diagram showing a vehicle dispatch management system to which an embodiment of the vehicle dispatch management system of the present invention is applied.

Hereinafter, an embodiment of the present invention will be described with reference to the drawings. FIG. 1 is a block diagram showing a vehicle dispatch management system DMS to which an embodiment of a vehicle dispatch management system and a vehicle dispatch management method of the present invention is applied. The vehicle dispatch management system DMS of the present embodiment includes a server 1, shared vehicles 2, and user terminals 3. The server 1 includes a vehicle information database 11, a map database 12, a dispatch request management device 13, a dispatch planning device 14, a dispatch instruction device 15, a movement instruction device 16, a total cruising distance calculation device 17, an energy supply determination device 18, and a supply instruction device 19. The shared vehicle 2 includes a vehicle position calculation device 21, an individual cruising distance calculation device 22, a vehicle information transmitting device 23, a movement instruction receiving device 24, an information presentation device 25, and an autonomous driving ECU 26. Although the individual cruising distance calculation device 22 is included in the shared vehicle 2, it may be included in the server 1. Although the information presentation device 25 and the autonomous driving ECU 26 are configured to exist together, it may be configured to include either. Details of each component will be described below.

[Server 1]

The server 1 is a programmable server configured by one or a plurality of computers (hardware including a CPU, a ROM, a RAM, and the like, in which software for realizing functions described later is installed), which performs various processes upon receiving a signal input from the outside. The details of the configuration method of the server 1 are not particularly limited, and a general server may be used.

The vehicle information database 11 is a database for storing vehicle information transmitted from the vehicle information transmission device 23 of the shared vehicle 2. Since a plurality of shared vehicles 2 exist, information of all shared vehicles 2 existing in a predetermined service area is stored in the vehicle information database 11. The vehicle information includes at least the position information of the shared vehicle 2 and the cruising distance. However, in addition to these information, the vehicle information may also include various state information of the shared vehicle 2, such as the traveling direction of the shared vehicle 2, vehicle speed, ON/OFF state of the door lock, open/close state of the door, seat belt sensor value, whether or not the autonomous driving is in progress. Further, in the vehicle information, information on the vehicle dispatch, such as whether or not the dispatch request from the user terminal 3 can be received, whether or not the shared vehicle 2 is in transit (in operation), whether or not the energy supply instruction is received, whether or not the passenger is present and the number of passengers, the getting-on/getting-off status, whether or not the vehicle has arrived at the destination of the movement instruction, and the like, is also stored in association with the ID of the respective shared vehicles.

The map database 12 includes, in addition to a so-called navigation map including at least road link information along which the shared vehicle 2 can travel, information on a place where the user can get on and off, an energy supply place (refueling or charging place), and a waiting place of the shared vehicle 2. The waiting place of the shared vehicle 2 refers to the space where the shared vehicle 2 stops when the shared vehicle 2 is waiting for the dispatch request in a state capable of being dispatched, one or a plurality of waiting places in one service area is set. In addition to these, pedestrian road link information for calculating a route along which the user walks may be included.

The dispatch request management device 13 receives a dispatch request from the user terminal 3 and transmits a dispatch request signal to the dispatch planning device 14. In addition, the dispatch request management device 13 receives a dispatch plan from the vehicle dispatch planning device 14 and transmits a dispatch information of the user to the user terminal 3.

The dispatch planning device 14 calculates the dispatch plan by using the dispatch request signal transmitted from the dispatch request management device 13 and the vehicle information stored in the vehicle information database 11, and transmits the calculated dispatch plan to the dispatch request management device 13 and the dispatch instruction device 15. The dispatch plan includes at least the shared vehicle 2 to be assigned to the user, the place where the user gets on and the place where the user gets off. To explain the method of calculating the dispatch plan, first, the closest getting on/off places are determined as the getting-on place and the getting-off place respectively by using the departure point and the destination point included in the dispatch request signal and the getting-on/off place information included in the map database 12. Next, the shared vehicle 2 closest to the getting-on place among all the shared vehicles 2 capable of receiving the dispatch request is determined as the assigned shared vehicle 2. The method of calculating such a vehicle dispatch plan is not particularly limited, and therefore, the method is not limited to the method described here, and other methods may be used.

The dispatch instruction device 15 calculates a route to the next destination by using the dispatch plan transmitted from the dispatch planning device 14 and the vehicle information included in the vehicle information database 11, and transmits the route to the movement instruction device 16.

The navigation map stored in the map database 12 is used to calculate the travelling routes and the estimated arrival times from the current position of the assigned shared vehicle 2 to the getting-on place, from the getting-on place to the getting-off place, and from the getting-off place to the predetermined waiting place, respectively, and to transmit them to the movement instruction device 16. Here, information such as a travelling route from a certain destination to the next destination is collectively referred to as "trip", and an entire dispatch schedule in which a plurality of trips are combined is referred to as "tour".

The movement instruction device 16 receives the tour from the vehicle dispatch instruction device 15 and receives the trip from a supply instruction device 19 which will be described later. The trip is for going to the energy supply place. After reassembling the tours, the trip information to the most recent destination is transmitted to the movement instruction receiving device 24 provided in the shared vehicle 2.

Here, a tour reassembly method will be described. When there is an input only from the dispatch instruction device 15, the received tour is regarded as a final tour as it is. When there is an input only from the supply instruction device 19 as in the case of the shared vehicle 2 in waiting at the waiting place, a trip for returning to the waiting place is added after the trip for going to the energy supply place thereby a final tour is made. Further, when the tour and the trip are received from both the dispatch instruction device 15 and the supply instruction device 19, the trip to the energy supply place is added immediately before the trip to the waiting place in the tour transmitted from the dispatch instruction device 15 thereby this is used as the final tour. As a result, a procedure is performed in which all of the getting-on/off of the passengers whose the vehicle dispatches have already been decided are completed before the vehicle goes for the energy supply.

The total cruising distance calculation device 17 calculates the total cruising distance on the basis of the cruising distances of the shared vehicles 2 stored in the vehicle information database 11, and transmits the total cruising distance to the energy supply determination device 18. In the present specification, the "cruising distance" means a distance at which the vehicle can continue traveling without suppling the travelling energy at the current travelling energy amount (in other words, the remaining travelling energy amount), and the travelling energy means a battery in the case of an electric vehicle, a battery and gasoline/light oil in the case of a hybrid vehicle, and gasoline/light oil in the case of an internal combustion engine vehicle.

The total cruising distance may be a value obtained by summing the cruising distances of all the shared vehicles 2 held in a predetermined service area, or may be an average value of the cruising distances of all the shared vehicles 2 held in a predetermined service area. When the average value of the cruising distances of all shared vehicles 2 is used as the total cruising distance, the first predetermined value described later can be set to one value regardless of the number of shared vehicles 2. Further, all the shared vehicles 2 referred to herein may be shared vehicles 2 in operation, and a total value or an average value of the cruising distances of the operating shared vehicles 2 may be used as the total cruising distance. The operating shared vehicle 2 does not mean the shared vehicle 2 during maintenance or energy supply, but means the shared vehicle 2 in a state in which the shared vehicle 2 can be dispatched in response to a dispatch request from a user.

The energy supply determination device 18 determines whether or not it is necessary to charge the entire vehicle dispatch management system DMS on the basis of the total cruising distance transmitted from the total cruising distance calculation device 17, selects the shared vehicle 2 to be supplied with energy, and transmits the determination result to the supply instruction device 19. More specifically, when the total cruising distance is equal to or less than the first predetermined value, it is determined that the travelling energy of the shared vehicle 2 needs to be supplied in principle. As the first predetermined value, for example, 50% may be set to the first predetermined value when the cruising distance of the shared vehicle 2 in which the traveling energy is full is 100%. The first predetermined value need not be a fixed value, and may be tuned depending on various factors such as the size of the service area, the density of the energy supply places, the number of operating shared vehicles 2, and the demand. For example, the first predetermined value may be set to a low value when the service area is narrow, the travelling distance of which the dispatched vehicle is short in response to a user's request and the density of the energy supply places is sufficiently high. Conversely, when the travelling distance of the dispatched vehicle is long and one travelling is nearly half of the cruising distance, the first predetermined value may be set high.

Here, in order to improve the determination accuracy by the energy supply determination device 18, the server 1 may be configured to calculate or predict various parameters used for the determination by the energy supply determination device 18. That is, as shown in FIG. 1, the server 1 may include, in addition to the energy supply determination device 18, a waiting vehicle number calculation device 181, a total cruising distance prediction device 182, a continuous operation time calculation device 183, a consecutive dispatch number calculation device 184, and a demand prediction device 185.

The waiting vehicle number calculation device 181 calculates the number of shared vehicles 2 for each of which the dispatch request is not requested by using the information of the shared vehicles 2 stored in the vehicle information database 11. The number of shared vehicles 2 for each of which the dispatch request is not requested is the number of shared vehicles 2 that can be dispatched when the dispatch request is requested in the future, i.e., the number of shared vehicles 2 that are in operation as described above. Then, even when the total cruising distance is equal to or less than the first predetermined value and the remaining amount of the total cruising distance of the dispatch management system DMS is reduced, if the number of shared vehicles 2 for each of which the dispatch request is not requested is equal to or less than the predetermined number, the energy supply determination device 18 executes a process of not instructing a supply instruction in order to temporarily restrain the reduction of the dispatch service. However, even if the number of shared vehicles 2 for each of which the dispatch request is not requested is equal to or less than a predetermined number, if the total cruising distance is equal to or less than a second predetermined value smaller than the first predetermined value, the energy supply determination device 18 determines the necessity of energy supply for at least one shared vehicle 2 by using at least one of the cruising distance of the shared vehicle 2, the distance from the current position of the shared vehicle 2 to the energy supply place, and the time required for energy supply. The second predetermined value is at least less than the first predetermined value, and may be, for example, 20% when the cruising distance of the shared vehicle 2 in which the traveling energy is full is 100%. The second predetermined value does not need to be a fixed value, and may be tuned depending on various factors similarly to the first predetermined value.

The total cruising distance prediction device 182 uses the information of the shared vehicle 2 stored in the vehicle information database 11 to calculate a predicted value of the total cruising distance after a predetermined time such as 30 minutes. To explain an example of the method of calculating the predicted value of the total cruising distance, first, the predicted value of the cruising distance of each shared vehicle 2 after a predetermined time is calculated on the basis of the cruising distance of each shared vehicle 2 stored in the vehicle information database 11 and the tour of each shared vehicle calculated by the movement instruction device 16. The predicted value of the cruising distance may be simply obtained by subtracting the moving distance after a predetermined time from the current cruising distance. When it is expected that energy supply such as refueling or charging will be completed after a predetermined time, an increase in the cruising distance due to energy supply is added. The sum total value or the average value of the predicted values of the cruising distance of the shared vehicles 2 thus obtained is used as the predicted value of the total cruising distance. As another calculation method, in the case where the past vehicle dispatch record is accumulated in the vehicle information database 11 or the like, the cruising distance to be consumed while traveling for a predetermined time may be calculated on the basis of the past vehicle dispatch record, and may be subtracted from the current total cruising distance. Then, in the case of using the predicted value of the total cruising distance predicted by the total cruising distance prediction device 182, the energy supply determining device 18 determines the necessity of the travelling energy supply of the shared vehicle 2 when the predicted value of the total cruising distance is equal to or less than the fourth predetermined value (which may be the same as or different from the first predetermined value described above).

The continuous operation time calculation device 183 calculates the time during which the shared vehicle 2 continuously operates without waiting at a predetermined waiting place by using the information of the shared vehicle 2 stored in the vehicle information database 11. In the case of a manned shared vehicle 2 driven by a driver, the longer the consecutive operation time after leaving the waiting place, the higher the driver's need for a break. Therefore, the energy supply determination device 18 sets the necessity of energy supply to be higher for the shared vehicle 2 which is away from the waiting place as the time in which the shared vehicle 2 is continuously operated after leaving the waiting place, that is, the time from the time when the shared vehicle 2 is last in the waiting place to the current time is longer.

The consecutive dispatch number calculation device 184 calculates the dispatch number of dispatching the shared vehicle 2 which is consecutively dispatched without waiting at a predetermined waiting place by using the information of the shared vehicle 2 stored in the vehicle information database 11. In the case of the shared vehicle 2 that performs autonomous driving in an unmanned manner, the larger the number of users, the higher the need for checking forgotten objects, cleaning the shared vehicle 2, and the like. Therefore, the energy supply determination device 18 sets the necessity of energy supply to be higher for the shared vehicle 2 which is away from the waiting place as the dispatch number of dispatching the shared vehicle 2 which is consecutively dispatched without waiting at the predetermined waiting place is more.

The demand prediction device 185 predicts the demand of each dispatch time zone and dispatch place by using the information of the shared vehicle 2 (including the past history information) stored in the vehicle information database 11. Since the serviceability decreases when the shared vehicle 2 close to the dispatch place is supplied with energy in a time period in which the demand is high, the energy supply determination device 18 sets the necessity of energy supply to be higher as the shared vehicle 2 is farther from the dispatch place in a time period in which the demand is high.

Among the above-described waiting vehicle number calculation device 181, total cruising distance prediction device 182, continuous operation time calculation device 183, consecutive dispatch number calculation device 184 and demand prediction device 185, one or more configurations may be employed as necessary. The specific processing of the energy supply determination device 18 will be described in detail in step S4 of FIG. 2.

The supply instruction device 19 calculates a travelling route to a specific energy supply place on the basis of the information of the shared vehicle 2 to be the energy supply target transmitted from the energy supply determination device 18, and transmits the result to the movement instruction device 16. Here, to explain the method of determining the energy supply place, first, the position information of the corresponding shared vehicle 2 is acquired from the vehicle information database 11, and the position information of the energy supply place is acquired from the map database 12. Next, a plurality of energy supply places close in linear distance from the current position of the shared vehicle 2 are selected, and the travelling route to each energy supply place is calculated, and the time until arrival at each energy supply place is calculated. The energy supply place having the shortest arrival time is determined as the energy supply place. Since charging takes a long time in the case of an electric vehicle, the charging place where there is an empty space may be given priority by also using the empty information of the charger in each energy supply place.

The supply instruction device 19 may additionally determine the necessity of the energy supply for the shared vehicle 2 whose cruising distance is equal to or less than the third predetermined value even if the energy supply determination device 18 does not select the shared vehicle 2 as the energy supply target. Essentially the energy supply determination device 18 determines whether or not energy supply is necessary by managing the remaining capacity of the service of the vehicle dispatch management system DMS as a whole. Therefore, even if there is the remaining capacity in the entire vehicle dispatch management system DMS, since it is impossible to individually deal with the shared vehicle 2 requiring energy supply, the supply instruction device 19 deals with it. Here, the third predetermined value for determining the energy supply may be a constant value, but may be calculated on the basis of the travelling distance from the current position of the shared vehicle 2 to the nearest energy supply place instead of the constant value. In the latter case, since the distance to the energy supply place varies in real time depending on the current place of the shared vehicle 2, the calculation of the travelling distance to the nearest energy supply place may be performed in a predetermined time period, for example, every five minutes.

The supply instruction device 19 disables to receive the dispatch request with respect to the shared vehicle 2 which is the energy supply target. More specifically, the vehicle information database 11 is accessed, and the dispatch request propriety information associated with the ID of the shared vehicle is changed to "not possible". In this case, in order to change from "not possible" to "possible", a processing process for periodically, for example every 5 minutes, checking the cruising distance and the vehicle dispatch request reception propriety state of each shared vehicle 2 in the vehicle information database 11 is added. Specifically, if there is a shared vehicle 2 whose dispatch request cannot be received after the cruising distance is recovered by energy supply, the dispatch request reception of the shared vehicle 2 may be changed to "possible".

[Shared Vehicle 2]

The shared vehicle 2 is a service vehicle that provides a mobile service in response to a user's request, and a plurality of shared vehicles exist in a predetermined service area. As described above, the shared vehicle 2 may be any of a vehicle having an internal combustion engine which drives by using gasoline or light oil as a fuel, an electric vehicle which drives by a motor by using a secondary battery or a fuel cell as a power source, and a hybrid vehicle which drives by using an internal combustion engine and a motor in combination. Energy supply in the case of a vehicle driven only by an internal combustion engine means refueling of gasoline or light oil, energy supply in the case of an electric vehicle driven only by a motor using a secondary battery as a power source means charging of a secondary battery, and energy supply in the case of an electric vehicle driven by a motor using a fuel cell as a power source (so-called fuel cell vehicle) means supplying of fuel (methanol or hydrogen) of a fuel cell. In the case of a hybrid vehicle that drives by using an internal combustion engine and a motor in combination, the energy supply means the refueling of gasoline or light oil and the charging of the secondary battery.

Further, any of a vehicle driven by a human driver, an autonomous driving vehicle that travels by autonomous driving in a state that the human driver gets on board, and an autonomous and unmanned driving vehicle in which the human driver does not get on board may be used. In the following embodiment, an autonomous driving vehicle in which a human driver gets on board and travels by autonomous driving will be described as an example.

The vehicle position calculation device 21 calculates the position of the shared vehicle 2, and outputs the calculated position to the vehicle information transmitting device 23. The vehicle-position calculation device 21 is a part of an electronic control unit (ECU) to which, for example, a GPS/INS sensor is connected, and outputs position data of latitude and longitude outputted from GPS/INS sensor at regular intervals (for example, 100 msec). The calculation method of the position information is not particularly limited, and other methods capable of specifying the position, such as map matching on the basis of map data, may be used.

The individual cruising distance calculation device 22 calculates the cruising distance of the shared vehicle 2, and outputs the calculated cruising distance to the vehicle information transmitting device 23. The individual cruising distance calculation device 22 is, for example, a software program incorporated in the ECU. In the case of a gasoline vehicle, the cruising distance may be calculated by using the remaining amount of gasoline and the fuel consumption based on the travelling record, or in the case of an electric vehicle, the cruising distance may be calculated on the basis of the remaining amount of battery and the electricity consumption based on the travelling record. The value of the cruising distance may be corrected on the basis of whether or not the air conditioner is used, information on traffic congestion in the vicinity, information on height difference, and the like.

The vehicle information transmitting device 23 is, for example, an onboard device having a mobile communication function of 4G/LTE, is connected to the vehicle position calculation device 21 and the individual cruising distance calculation device 22 via CAN, LAN, or the like, and transmits the inputted vehicle position and cruising distance to the vehicle information database 11 of the server 1 every predetermined time (for example, 100 msec). Although not shown in FIG. 1, the vehicle information transmitting device 23 may also be connected to the vehicle CAN and other sensors, may acquire various vehicle states such as the traveling direction of the vehicle, the vehicle speed, the opening and closing states of the door lock and the door, the seat belt sensor value, whether or not the vehicle is in autonomous driving, and the like, and then may transmit them as the vehicle information.

The movement instruction receiving device 24 is, for example, an onboard device having a mobile communication function of 4G/LTE, and outputs trip information transmitted from the movement instruction device 16 of the server 1 to the information presentation device 25 and the autonomous driving ECU 26 connected via CAN, LAN, or the like. The movement instruction receiving device 24 may be integrated with the vehicle information transmitting device 23 having a communication function with the server 1.

The information presentation device 25 is, for example, a portable terminal such as a smart phone, and presents trip information received by the movement instruction receiving device 24 to a driver (user) by software implemented as an application of the portable terminal. More specifically, for example, after a map is displayed on the screen, the destination is displayed by marking the place of the destination included in the trip with an asterisk or the like, and the travelling route is displayed by drawing a line connecting the route information (a group of points of latitude and latitude) also included in the trip. Information may be presented by using voice as necessary, such as by sounding a sound to draw attention when a new trip is received. The method of realizing the information presentation device 25 is not necessarily limited to a portable terminal such as a smart phone, and may be realized by, for example, a combination of a personal computer for performing a drawing operation and a display, or may be realized by implementing an application for a Web browser in the server 1 and accessing the Web browser with a tablet or the like.

The autonomous driving ECU 26 is an electronic control unit for travelling to a destination by autonomous driving on the basis of the travelling route data to the destination outputted from the movement instruction receiving device 24. The method for realizing the autonomous driving is not particularly limited, and a generally known method may be used. Although not shown in FIG. 1, the autonomous driving ECU 26 may manage a vehicle dispatch movement status such as route reception completion, moving, arriving at a destination, and the like, and may output the status to the vehicle information transmitting device 23.

[User Terminal 3]

The user terminal 3 is a computer in which software for a user who requests a dispatch request is installed (e.g., a portable computer such as a smart phone in which a dispatch request application is implemented), and has a communication function of accessing the server 1 via a telecommunication network. The user terminal 3 transmits a dispatch request, which will be described below, to the dispatch request management device 13 on the basis of an input from the user.

In addition, the user terminal 3 receives the user dispatch information from the dispatch request management device 13, and presents it to the user by using a display or the like provided in the user terminal 3.

The dispatch request transmitted to the dispatch request management device 13 includes at least a departure point and a destination, the destination is acquired by an input of the user, and the departure point may be acquired from position information of the user, or may be acquired by an input of the user. The dispatch request may further include additional information such as designation of a via-point, designation of getting-on/off points, number of passengers, reservation time, propriety of car pool, and the like. The user dispatch information transmitted from the dispatch request management device 13 includes at least information for identifying the getting-on/off places of the user, the current position of the shared vehicle 2 dispatched, and the shared vehicle 2 to be dispatched. However the user dispatch information may also include additional information, such as the time at which the shared vehicle 2 arrives at the getting-on place, the travelling time from the getting-on place to the getting-off place, and the recommended walking route for the user to travel to the getting-on place, on the basis of the information calculated by the dispatch instruction device 15. The user terminal 3 is not particularly limited to the above-described configuration, and other methods may be used, such as using a personal computer in which as a Web application is implemented and requesting a vehicle dispatch request from the personal computer via a telecommunication network such as the Internet.

[Operation of the Vehicle Dispatch Management System]

Figure 2:
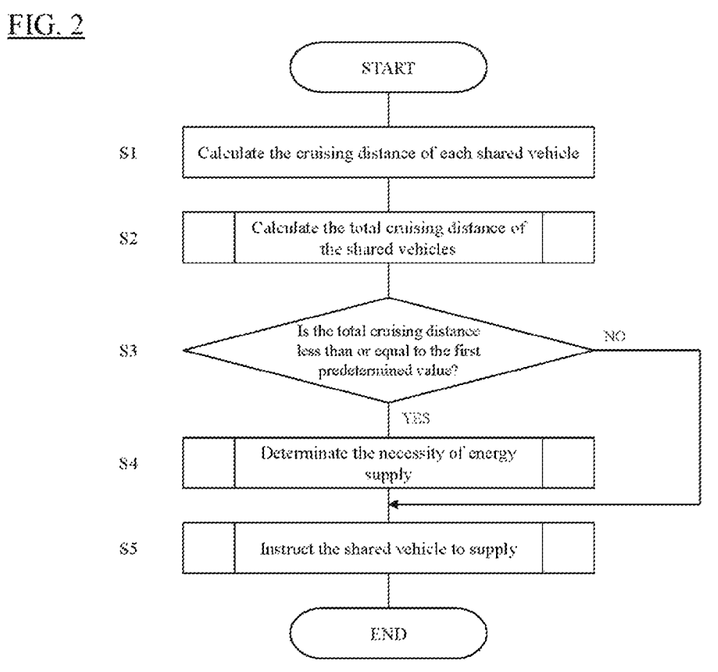
FIG. 2 is a flowchart showing a processing procedure of the vehicle dispatch management system shown in FIG. 1.
Figure 3:
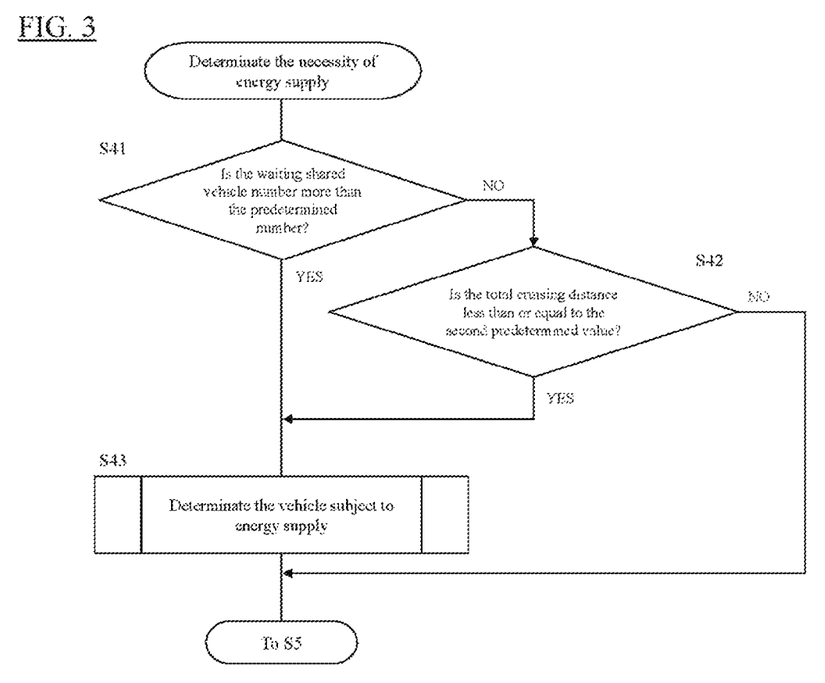
FIG. 3 is a flowchart showing a subroutine of step S4 in FIG. 2.

Next, a processing procedure of the vehicle dispatch management system DMS of the present embodiment will be described with reference to FIGS. 2 and 3. FIG. 2 is a flowchart showing a processing procedure of the vehicle dispatch management system DMS of the present embodiment, and FIG. 3 is a flowchart showing a subroutine of step S4 of FIG. 2. The routine shown in FIGS. 2 and 3 is executed at predetermined time intervals.

First, in step S1 of FIG. 2, the individual cruising distance calculation device 22 of each of the plurality of shared vehicles 2 held in the predetermined service area calculates the cruising distance by using the remaining fuel amount, the actual fuel consumption, the remaining battery amount, the actual electricity consumption, and the like, and transmits the cruising distance to the vehicle information database 11 via the vehicle information transmitting device 23. The individual cruising distance data is calculated for all the shared vehicles 2 held in the predetermined service area, that is, not only for the operating shared vehicles 2 which are ready to be dispatched in response to the dispatch request from the user, but also for the shared vehicles 2 during maintenance, energy supply, and the like.

In the following step S2, the total cruising distance calculation device 17 of the server 1 calculates the total cruising distance of the shared vehicle 2 by using the individual cruising distances of the shared vehicle 2 stored in the vehicle information database 11. The total cruising distance is calculated by the total cruising distance calculation device 17 based on the cruising distance of the operating shared vehicle 2 in a state in which the vehicle can be dispatched in response to a vehicle dispatch request from the user, and the cruising distance of the shared vehicle 2 during maintenance, energy supply, or the like is excluded from the calculation. The total cruising distance of all the operating shared vehicles 2 may be the total value of the cruising distance of each of the operating shared vehicles 2 stored in the vehicle information database 11, but an average value is employed below.

In the following step S3, it is determined whether or not the total cruising distance calculated in step S2 is equal to or less than a first predetermined value determined in advance. When the total cruising distance is larger than the first predetermined value in step S3, the vehicle dispatch management system DMS determines that there is no need to supply energy to the shared vehicle 2 as a whole, and proceeds to step S5. On the other hand, when the total cruising distance is equal to or less than the first predetermined value, the vehicle dispatch management system DMS determines that energy needs to be supplied to the shared vehicle 2 as a whole, and proceeds to step S4. Instead of the calculation of the total cruising distance in step S2, the predicted value of the total cruising distance predicted by the total cruising distance prediction device 182 may be used, and instead of the determination in step S3, the energy supply determination device 18 may determine that the traveling energy supply of the shared vehicle 2 is necessary when the predicted value of the total cruising distance is equal to or less than the fourth predetermined value.

Figure 4:
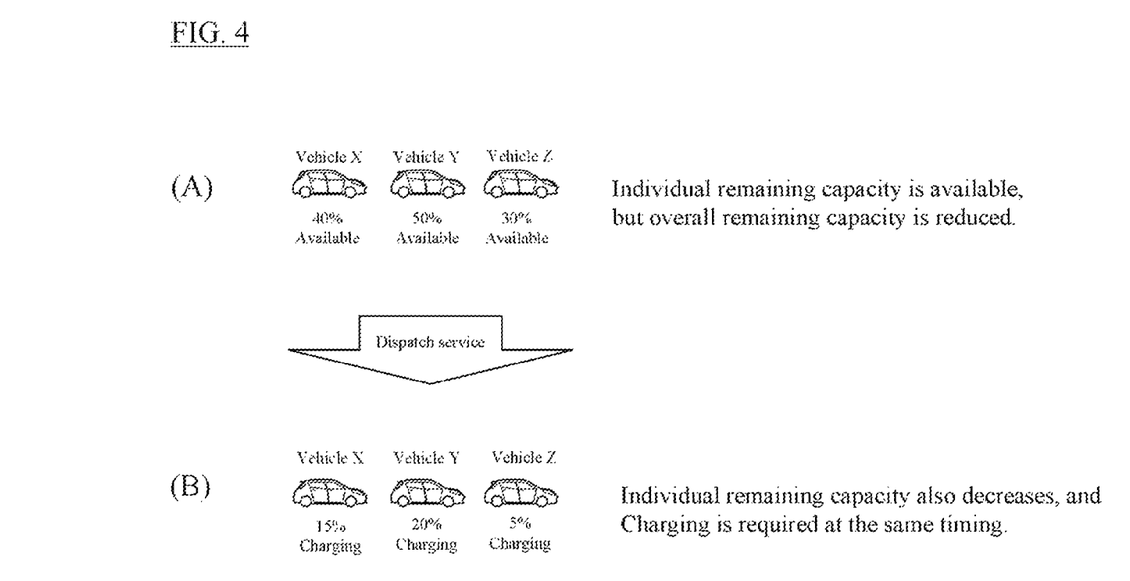
FIG. 4 is a diagram showing a situation of reduction in the remaining energy amount of three shared vehicles X, Y, and Z arranged in a predetermined service area.

The (A) part of FIG. 4 is a diagram showing a case in which the remaining energy amounts (for example, the SOC of the battery when the shared vehicles X, Y, Z are electric vehicles) are 40%, 50%, and 30% for three shared vehicles X, Y, and Z arranged in a predetermined service area, respectively. The (B) part of FIG. 4 is a diagram showing a state in which the remaining energy amounts are reduced from the state shown in the part (A) of FIG. 4 to 15%, 20%, and 5%, respectively, as a result of the shared vehicles X, Y, and Z being supplied to the dispatch service. Assuming that the remaining energy amounts of the three shared vehicles X, Y, and Z are individually managed, since all of the three shared vehicles X, Y, and Z have a remaining energy amount of 30% or more in the state shown in the part (A) of FIG. 4, it can be said that they have remaining capacity individually. However, if the vehicle dispatch service is continued without energy supply for the reason that they have sufficient remaining capacity individually, and the remaining energy amounts of the three shared vehicles X, Y, and Z are reduced as shown in the part (B) of FIG. 4, the timings of energy supply of the three shared vehicles X, Y, and Z overlap, and a time zone in which the vehicle dispatch service cannot be provided occurs.

On the other hand, as in the vehicle dispatch management system DMS of the present embodiment, when it is assumed that the total cruising distances of the three shared vehicles X, Y, and Z (corresponding to the remaining energy amount in the example shown in FIG. 4) are managed, it can be determined that the remaining capacity is reduced as a whole by grasping that an average value of the remaining energy amount is 40% in the state shown in the part (A) of FIG. 4. Therefore, in the dispatch management system DMS of the present embodiment, it is possible to configured to perform the energy supply in the state shown in the part (A) of FIG. 4. As a result, it is possible to avoid a situation in which all of the three shared vehicles X, Y, and Z cannot be provided for the vehicle dispatch service as shown in the part (B) of FIG. 4.

Figure 5:
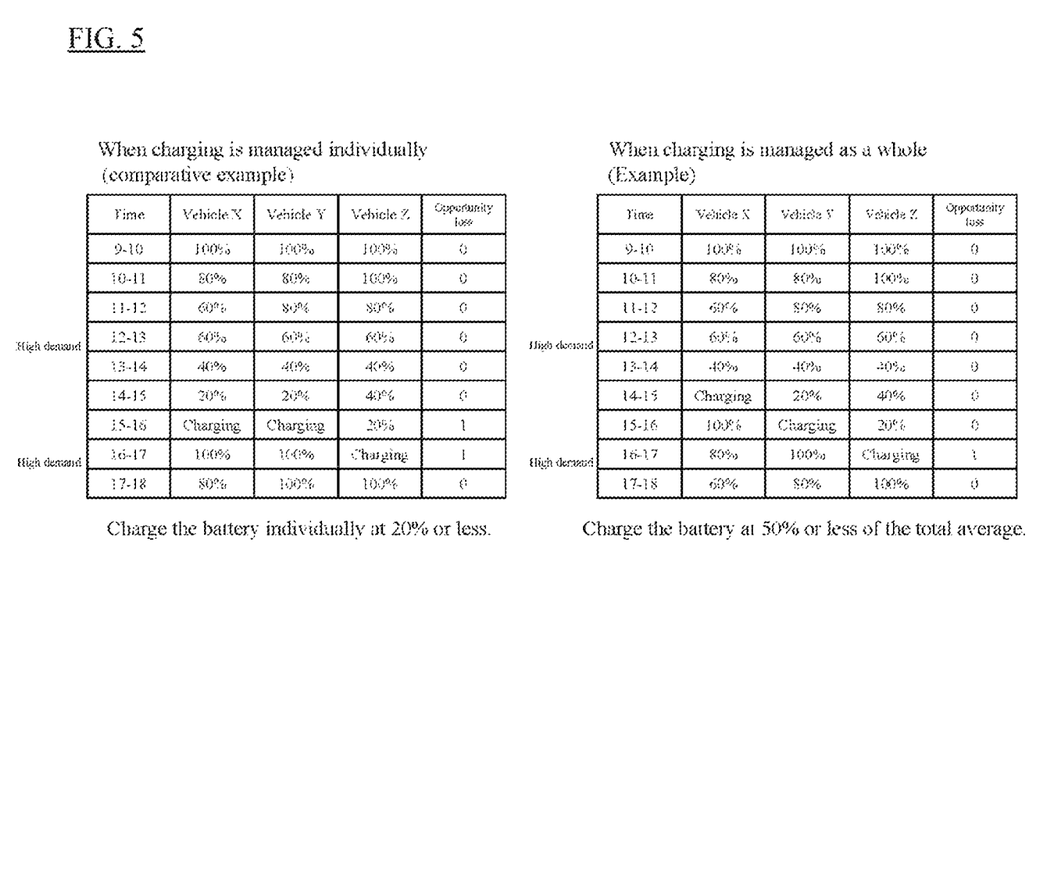
FIG. 5 is a diagram showing an example of a simulation of the remaining energy amount and energy supply of three shared vehicles X, Y, and Z arranged in a predetermined service area.

FIG. 5 is a diagram showing simulation results when three shared vehicles X, Y, and Z are arranged in a predetermined service area, battery is full charge (SOC=100%) at the start of business at 9:00, battery is consumed 20% by 1 hour use, and charging takes 1 hour, and basically the demand is 2 vehicles, and the demand is 3 vehicles at 12:00 to 13:00 at noon and at 16:00 to 17:00 at evening. The comparative example shown on the left of FIG. 5 is a simulation in which the remaining energy amounts of the three shared vehicles X, Y, and Z are individually managed, and energy supply is performed when the remaining energy amount is SOC 20%. On the other hand, the embodiment shown on the right in FIG. 5 is a simulation in which the remaining energy amounts of all three shared vehicles X, Y, and Z are managed, and energy is supplied when the average value of the remaining energy amounts of the three shared vehicles X, Y, and Z is SOC 50%. It is assumed that the usage states (remaining energy amounts) of the three shared vehicles X, Y, and Z are the same between the start of business at 9:00 and 14:00.

As an example of the simulation of FIG. 5, in the comparative example of the left figure, since the remaining energy amount of the shared vehicle X and the shared vehicle Y becomes 20% or less only at 14:00 to 15:00, it is necessary to supply the energy of these two shared vehicles X and Y between 15:00 and 16:00. At 14:00 to 15:00, the remaining energy amount of the shared vehicle Z is 20% or more, and therefore, the energy supply is not performed between 15:00 and 16:00. Therefore, only one vehicle (shared vehicle Z) can be used despite the demand of two vehicles between 15:00 and 16:00, and only two vehicles (shared vehicles X and Y) can be used between 16:00 and 17:00 in the high demand time zone.

On the other hand, in the embodiment shown on the right, since the average value of the remaining energy amounts of the three shared vehicles X, Y, and Z is 50% or less at 13:00 to 14:00, the remaining two shared vehicles Y and Z will be used while supplying energy of the shared vehicle X between 14:00 and 15:00, the remaining two shared vehicles X and Z will be used while supplying energy of the shared vehicle Y between 15:00 and 16:00, and the remaining two shared vehicles X and Y will be used while supplying energy of the shared vehicle Z between 16:00 and 17:00. Therefore, only two vehicles (shared vehicles X and Y) can be used between 16:00 and 17:00 in the high demand time zone, but the demand of two vehicles can be met between 15:00 and 16:00 before that time. As described above, in the dispatch management system DMS of the present embodiment, the timing of energy supply can be dispersed.

Refer to FIG. 2, in step S4, it is specifically determined the necessity of energy supply, and in step S5, a supply instruction is output to the shared vehicle 2. That is, in step S41 of FIG. 3, the waiting vehicle number calculation device 181 reads the vehicle information stored in the vehicle information database 11, acquires the number of operating shared vehicles 2 for each of which the vehicle dispatch request is not requested from the user (hereinafter, also referred to as waiting shared vehicles), determines whether or not the number of waiting shared vehicles is equal to or greater than a predetermined value, the process proceeds to S43 if the number of waiting shared vehicles is equal to or greater than a predetermined value, and otherwise the process proceeds to S42. The predetermined value need not be a fixed value, and may be tuned depending on various factors such as the size of the service area and the demand. For example, assuming that the total number of shared vehicles 2 is 10 and the predetermined number is 20% of all shared vehicles 2, if there are two or more waiting shared vehicles 2, the process proceeds to step S43 to determine a shared vehicle to be supplied with energy.

In S 42, it is determined whether or not the total cruising distance is equal to or less than the second predetermined value, and if it is equal to or less than the second predetermined value, the process proceeds to S43, and if it exceeds the second predetermined value, the process proceeds to step S5 in FIG. 2 without performing the process of step S43. When it is determined in step S3 of FIG. 2 that the total cruising distance is equal to or less than the first predetermined value and that the remaining amount of the cruising distance of the vehicle dispatch management system DMS as a whole is reduced, it is necessary to supply energy so that the total cruising distance exceeds the first predetermined value in principle. However, when the number of shared vehicles 2 for each of which the dispatch request is not requested is equal to or less than a predetermined number, the dispatch service is temporarily lowered. Steps S41 and S42 are processes for temporarily restrain the deterioration of the vehicle dispatch services, and only when the total cruising distance is equal to or less than the second predetermined value smaller than the first predetermined value, the shared vehicle to be supplied with energy is determined, and when the total cruising distance is between the second predetermined value and the first predetermined value, the vehicle dispatch is provided without decreasing the number of shared vehicles 2 that can be dispatched.

In the determination routine of the shared vehicle 2 to be supplied with energy in S 43, at least one shared vehicle 2 to be supplied with energy is selected from among the operating shared vehicles 2, and the selection result is output to the supply instruction device 19. The selection of the shared vehicle 2 to be the energy supply target can be determined on the basis of at least one parameter among the cruising distance of the shared vehicle 2, the distance from the current position of the shared vehicle 2 to the energy supply place, and the time required for the energy supply of the shared vehicle 2. Here, the cruising distance of the shared vehicle 2 is the cruising distance of each shared vehicle 2 acquired from the vehicle information database 11, it is configured that the shared vehicle 2 is easily selected to the energy supply object as the cruising distance is shorter. The distance from the current position of the shared vehicle 2 to the energy supply place is calculated on the basis of the current position information of each shared vehicle 2 acquired from the vehicle information database 11 and the information of the energy supply place acquired from the map database 12. Since the energy supply is more efficiently completed as the travelling distance of each shared vehicle 2 to the energy supply place is shorter, it is configured that the shared vehicle 2 is easily selected to the energy supply object as the travelling distance is shorter. The time required for energy supply of the shared vehicle 2 is calculated on the basis of the travelling distance of each shared vehicle 2 acquired from the vehicle information database 11. Since the energy supply is more efficiently completed as the time required for energy supply is shorter, it is configured that the shared vehicle 2 is easily selected to the energy supply object as the supply time is shorter. One of these three parameters may be employed, or a plurality of parameters may be integrated to determine the target vehicle.

The selection of the shared vehicle 2 to be the energy supply target in step S43 may use at least one of the continuous operation time calculation device 183, the consecutive dispatch number calculation device 184, and the demand prediction device 185 described above. When the continuous operation time calculation device 183 is used to calculate the time during which the shared vehicle 2 continuously operates without waiting at a predetermined waiting place, the energy supply determination device 18 sets the necessity of energy supply to be higher for the shared vehicle 2 which is away from the waiting place as the time of continuous operation after leaving the waiting place, that is, the time from the time when it was last in the waiting place to the current time is longer. This makes it possible to select a target vehicle in consideration of the driver's need for a break, such as a manned vehicle driven by a driver.

Further, when the consecutive dispatch number calculation device 184 is use to calculate the dispatch number of dispatching the shared vehicle 2 which is continuously dispatched without waiting at a predetermined waiting place, the energy supply determination device 18 sets the necessity of energy supply to be higher for the shared vehicle 2 which is away from the waiting place as the dispatch number of dispatching the vehicle which is consecutively dispatched without waiting at a predetermined waiting place is more. This makes it possible to select a target vehicle in consideration of increasing needs for checking forgotten objects and cleaning the shared vehicle 2 when assuming that the vehicle is autonomously driven by unmanned driving.

When the demand prediction device 185 is used to predict the demand of each dispatch time zone and dispatch place, the energy supply determination device 18 sets the necessity of energy supply to be higher as the shared vehicle 2 is farther from the dispatch place in the time zone in which the demand is high. As a result, the shared vehicle 2 close to the vehicle dispatch place can be provided to the vehicle dispatch service during the time period when the demand is high.

As described above, according to the vehicle dispatch management system and the vehicle dispatch management method of the vehicle dispatch management system DMS of the present embodiment, in the on-demand type vehicle dispatch service in which a plurality of shared vehicles 2 are held in a predetermined service area, the total cruising distance of all shared vehicles 2 is used as an index of the remaining service capacity, the energy supply instruction of the individual shared vehicles 2 is determined in principle when the total cruising distance is equal to or less than the first predetermined value and the supply instruction is performed, so that it is possible to maintain the total cruising distance at or more than a predetermined value. As a result, it is possible to maintain the remaining service capacity at or more than a predetermined value.

Further, according to the vehicle dispatch management system and the vehicle dispatch management method of the vehicle dispatch management system DMS of the present embodiment, since the average value of the cruising distances of all the shared vehicles 2 is used as the total cruising distance, it is possible to make a determination with one threshold value (first predetermined value or fourth predetermined value) regardless of the number of shared vehicles 2.

According to the vehicle dispatch management system and the vehicle dispatch management method of the vehicle dispatch management system DMS of the present embodiment, when the total cruising distance is equal to or less than the first predetermined value, the necessity of energy supply of each shared vehicle 2 is determined on the basis of at least one of the cruising distance of the shared vehicle 2, the distance from the current position of the shared vehicle 2 to the energy supply place, and the time required for energy supply. By using the cruising distance of the shared vehicle 2 as a parameter, it is possible to preferentially select the shared vehicle 2 having no remaining capacity, and to preferentially select the shared vehicle 2 close to the energy supply place or the shared vehicle 2 having a short time required for energy supply, so that it is possible to efficiently increase the service remaining capacity. By taking all of them into consideration, it is possible to select an optimum shared vehicle 2 with good balance.

According to the vehicle dispatch management system and the vehicle dispatch management method of the vehicle dispatch management system DMS of the present embodiment, even when the total cruising distance is equal to or less than the first predetermined value, if the number of waiting vehicles for each of which the vehicle dispatch instruction is not instructed is equal to or less than the predetermined number, the energy supply instruction is not instructed. Therefore, it is possible to avoid the energy supply instruction which temporarily further lowers the service capacity when the demand is high and the service capacity is lowered. That is, since the shared vehicle 2 during the energy supply cannot respond to the user's request and the energy supply should be carried out in principle when the service capacity is sufficient, the number of waiting vehicles for each of which the vehicle dispatch instruction is not instructed is used as an alternative parameter.

According to the vehicle dispatch management system and the vehicle dispatch management method of the vehicle dispatch management system DMS of the present embodiment, even when the number of waiting vehicles for each of which a vehicle dispatch instruction is not instructed is equal to or less than a predetermined number, if the total cruising distance is equal to or less than a second predetermined value smaller than the first predetermined value, the necessity of energy supply is determined for at least one vehicle. Therefore, it is possible to restrain the reduction of the service capacity in the future. In principle, energy supply is performed when the service capacity is sufficient, but if high demand continues, energy supply cannot be performed indefinitely, and therefore, in the case where the total cruising distance is significantly lowered, energy supply is performed by using the second predetermined value even if there is a risk of not being able to respond to the immediate demand of the user. The two thresholds of the first predetermined value and the second predetermined value can be used to adjust the balance between responding to the immediate demand or preparing for future demand.

According to the vehicle dispatch management system and the vehicle dispatch management method of the vehicle dispatch management system DMS of the present embodiment, the shared vehicle to be a target for calculating the total cruising distance is regarded as the operating shared vehicle 2 based on the vehicle dispatch instruction, and the waiting vehicle is excluded from the determination. Since the waiting shared vehicle 2 can be supplied with energy at an appropriate timing, it is possible to appropriately determine the necessity of energy supply for the operating shared vehicle 2.

According to the vehicle dispatch management system and the vehicle dispatch management method of the vehicle dispatch management system DMS of the present embodiment, energy is individually supplied when the remaining cruising distance of the shared vehicle 2 is equal to or less than the third predetermined value regardless of the determination result of the necessity of energy supply based on the total cruising distance, so that it is possible to reduce the risk that the cruising distance is too small to respond to the user's request.

According to the vehicle dispatch management system and the vehicle dispatch management method of the vehicle dispatch management system DMS of the present embodiment, since the necessity of energy supply is determined on the basis of the predicted value of the total cruising distance after a predetermined time, it is possible to prevent a reduction in the remaining service capacity in advance.

Further, according to the vehicle dispatch management system and the vehicle dispatch management method of the vehicle dispatch management system DMS of the present embodiment, when the total cruising distance is equal to or less than the first predetermined value and the necessity of energy supply of the shared vehicle 2 is individually determined, since the continuous operation time is also taken into consideration, the shared vehicle 2 having a long continuous operation time can be preferentially directed to energy supply. In particular, in the case of the shared vehicle 2 driven by the driver, the priority of the driver's break increases as the continuous operation time increases, so that the effect of adjusting the timing of the driver's break and the energy supply can be expected.

Further, according to the vehicle dispatch management system and the vehicle dispatch management method of the vehicle dispatch management system DMS of the present embodiment, when the total cruising distance is equal to or less than the first predetermined value and the necessity of energy supply of the shared vehicle 2 is individually determined, the consecutive dispatch number which is also taken into consideration, so that the shared vehicle 2 with a large consecutive dispatch number can be preferentially directed to energy supply. Especially in the case of an unmanned autonomous driving vehicle in which a driver is unnecessary, although a break is unnecessary, when the dispatch number is large, the possibility of the forgotten object and the necessity of cleaning the shared vehicle 2 are increased, so that the effect of adjusting the timing of checking the forgotten object, cleaning the shared vehicle 2, and the like and energy supply can be expected.

Further, according to the vehicle dispatch management system and the vehicle dispatch management method of the vehicle dispatch management system DMS of the present embodiment, when the total cruising distance is equal to or less than the first predetermined value and the necessity of energy supply of the shared vehicle 2 is individually determined, the distance from a place where high demand is expected is also taken into consideration on the basis of the demand prediction, so that the shared vehicle 2 far from the high demand place can be preferentially directed to the energy supply. As a result, it is possible to reduce the risk of not being able to respond to the user's request.

Further, according to the vehicle dispatch management system and the vehicle dispatch management method of the vehicle dispatch management system DMS of the present embodiment, since the reception of the dispatch request from the user is set being impossible until the completion of the energy supply after the determination of the energy supply, it is possible to restrain the risk of receiving the dispatch request and being dispatched the vehicle while the vehicle is going to the energy supply.

Further, according to the vehicle dispatch management system and the vehicle dispatch management method of the vehicle dispatch management system DMS of the present embodiment, the shared vehicle 2 has an autonomous driving function, and travels to the energy supply place by autonomous driving in accordance with the energy supply instruction, so that it is possible to eliminate a care mistake in which the driver does not notice the energy supply instruction, and to execute the energy supply plan reliably. In the case of unmanned autonomous driving in which a driver is unnecessary, a plan of energy supply can be steadily executed without considering a break of the driver.

DESCRIPTION OF REFERENCE NUMERALS

DMS . . . Dispatch management system
1 . . . Server
   11 . . . Vehicle information database
   12 . . . Map database
   13 . . . Dispatch request management device
   14 . . . Dispatch planning device
   15 . . . Dispatch instruction device
   16 . . . Movement instruction device
   17 . . . Total cruising distance calculation device
   18 . . . Energy supply determination device
      181 . . . Waiting vehicle number calculation device
      182 . . . Total cruising distance prediction device
      183 . . . Continuous operation time calculation device
      184 . . . Consecutive dispatch number calculation device
      185 . . . Demand prediction device
   19 . . . Supply instruction device
2 . . . Shared vehicle
   21 . . . Vehicle position calculation device
   22 . . . Individual cruising distance calculation device
   23 . . . Vehicle information transmitting device
   24 . . . Movement instruction receiving device
   25 . . . Information presentation device
   26 . . . Autonomous driving ECU
3 . . . User terminal

The invention claimed is:

1. A vehicle dispatch management system which manages a plurality of shared vehicles and dispatches a dispatched vehicle chosen from the plurality of shared vehicles in response to a dispatch request from a user, the vehicle management system comprising:
a server comprising a processor, a database, and a transceiver, wherein the processor is configured to:
receive a cruising distance of each of the plurality of shared vehicles via the transceiver;
store the cruising distance of each of the plurality of shared vehicles in the database;
calculate a total cruising distance of the plurality of shared vehicles based on the cruising distance of each of the plurality of shared vehicles stored in the database;
determine a necessity of traveling energy supply of the plurality of shared vehicles when the total cruising distance is equal to or less than a first predetermined value;
send a supply instruction to the dispatched vehicle based on determining the necessity of traveling energy supply of the plurality of shared vehicles via the transceiver; and
dispatch the dispatched vehicle to the user based on the supply instruction being received at the dispatched vehicle.

2. The vehicle dispatch management system according to claim 1, wherein an average value of the cruising distances of all the plurality of shared vehicles is used as the total cruising distance.

3. The vehicle dispatch management system according to claim 1, wherein the processor determines the necessity of traveling energy supply for at least one shared vehicle of the plurality of shared vehicles by using the cruising distance of the at least one shared vehicle, a distance from a current position of the at least one shared vehicle to an energy supply place, and a time required for energy supply.

4. The vehicle dispatch management system according to claim 1, wherein the processor is further configured to calculate a number of shared vehicles from the plurality of shared vehicles for each of which the dispatch request is not requested, and wherein the processor does not instruct the supply instruction when the number of shared vehicles for each of which the dispatch request is not requested is equal to or less than a predetermined number even if the total cruising distance is equal to or less than the first predetermined value.

5. The vehicle dispatch management system according to claim 4, wherein the processor determines the necessity of traveling energy supply for at least one shared vehicle of the plurality of shared vehicles by using the cruising distance of the at least one shared vehicle, a distance from a current position of the at least one shared vehicle to an energy supply place and a time required for energy supply when the total cruising distance is equal to or less than a second predetermined value smaller than the first predetermined value even if the number of shared vehicles for each of which the dispatch request is not requested is equal to or less than a predetermined number.

6. The vehicle dispatch management system according to claim 1, wherein
the processor calculates the total cruising distance for shared vehicles, from the plurality of shared vehicles, that have been instructed to be dispatched, and
the processor determines the necessity of traveling energy supply of all the shared vehicles that have been instructed to be dispatched.

7. The vehicle dispatch management system according to claim 1, wherein the processor sends the supply instruction to the dispatched vehicle regardless of a determination result of the processor when the cruising distance of each of the plurality of shared vehicles is equal to or less than a third predetermined value.

8. The vehicle dispatch management system according to claim 1, wherein the processor is further configured to calculate a predicted value of the total cruising distance after a predetermined time, and wherein the processor determines the necessity of traveling energy supply of the plurality of shared vehicles when the predicted value of the total cruising distance is equal to or less than a fourth predetermined value.

9. The vehicle dispatch management system according to claim 1, wherein the processor is further configured to calculate a time during which each of the plurality of shared vehicles continuously operates without waiting at a predetermined waiting place, and wherein the processor determines the necessity of traveling energy supply of the plurality of shared vehicles in consideration of the time during which each of the plurality of shared vehicles continuously operates.

10. The vehicle dispatch management system according to claim 1, wherein the processor is further configured to calculate a dispatch number of dispatching the dispatched vehicle without waiting at a predetermined waiting place, and wherein the processor determines the necessity of traveling energy supply of the plurality of shared vehicles in consideration of the dispatch number of the dispatched vehicle.

11. The vehicle dispatch management system according to claim 1, wherein the processor is further configured to predict a demand of each dispatch time zone and dispatch place, and wherein the processor determines the necessity of traveling energy supply of the plurality of shared vehicles on a basis of predicting the demands in consideration of the dispatch time zone and distance from the dispatch place in which demand is high.

12. The vehicle dispatch management system according to claim 1, wherein the processor is further configured to set whether or not to receive the dispatch request of the dispatched vehicle, and wherein the processor sets a reception of the dispatch request being impossible for the dispatched vehicle determined to be supplied energy until energy supply is completed after the supply instruction is instructed.

13. The vehicle dispatch management system according to claim 1, wherein the dispatched vehicle having an autonomous driving function travels to an energy supply place by the autonomous driving function when the supply instruction of the traveling energy is received.

14. A vehicle dispatch management method by a server for managing a plurality of shared vehicles and dispatching a dispatched vehicle in response to a dispatch request from a user, the server comprising a processor, a database, and a transceiver, the method comprising:

- receiving, by the transceiver, a cruising distance of each of the plurality of shared vehicles;
- storing, in the database, the cruising distance of each of the plurality of shared vehicles;
- calculating, by the processor, a total cruising distance of all of the plurality of shared vehicles based on the cruising distance of each of the plurality of shared vehicles stored in the database;
- determining, by the processor, a necessity of traveling energy supply of the plurality of shared vehicles when the total cruising distance is equal to or less than a first predetermined value;
- instructing, by the processor, a supply instruction to the dispatched vehicle on a basis of determining the necessity of traveling energy supply of the plurality of shared vehicles via the transceiver;
- dispatching the dispatched vehicle to the user based on the supply instruction being received at the dispatched vehicle.

* * * * *